United States Patent [19]

Kuboshima

[11] 4,089,599
[45] May 16, 1978

[54] DEVICE FOR CORRECTING DISTORTION OF A PROJECTED IMAGE

[75] Inventor: Makoto Kuboshima, Tokyo, Japan

[73] Assignee: Fuji Photo Film Co., Ltd., Minami-ashigara, Japan

[21] Appl. No.: 739,786

[22] Filed: Nov. 8, 1976

[30] Foreign Application Priority Data

Nov. 18, 1975 Japan .............................. 50-138374

[51] Int. Cl.² .............................................. B03B 21/00
[52] U.S. Cl. ................................ 353/70; 353/DIG. 3
[58] Field of Search ............... 353/69, 38, 70, DIG. 3, 353/DIG. 6, 102, 81; 350/181, 211

[56] References Cited

U.S. PATENT DOCUMENTS

| | | |
|---|---|---|
| 1,283,676 | 11/1918 | Comstock et al. ..................... 353/70 |
| 2,354,614 | 7/1944 | Reason ................................... 353/70 |
| 2,795,996 | 6/1957 | Sauer ..................................... 353/70 |
| 3,253,505 | 5/1966 | Miller ..................................... 353/70 |
| 4,002,408 | 1/1977 | Amma .................................... 353/70 |

Primary Examiner—Harry N. Haroian
Attorney, Agent, or Firm—Gerald J. Ferguson, Jr.; Joseph J. Baker

[57] ABSTRACT

In an over-head projector or a slide projector, a positive or negative lens is provided immediately in front of a transparency in the projector. The lens is normally perpendicular to the optical axis of the projection lens, and is inclined to an oblique angle with respect to the optical axis when the image projected on a projection screen is distorted owing to oblique projection of the image on the screen.

4 Claims, 4 Drawing Figures

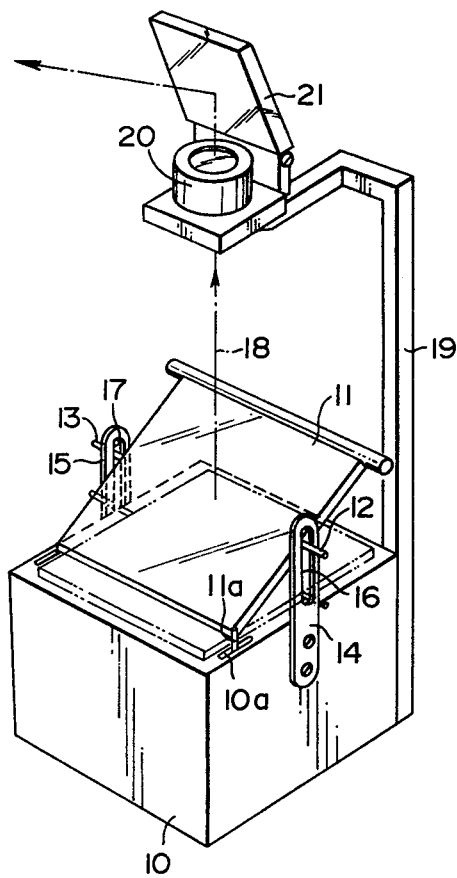
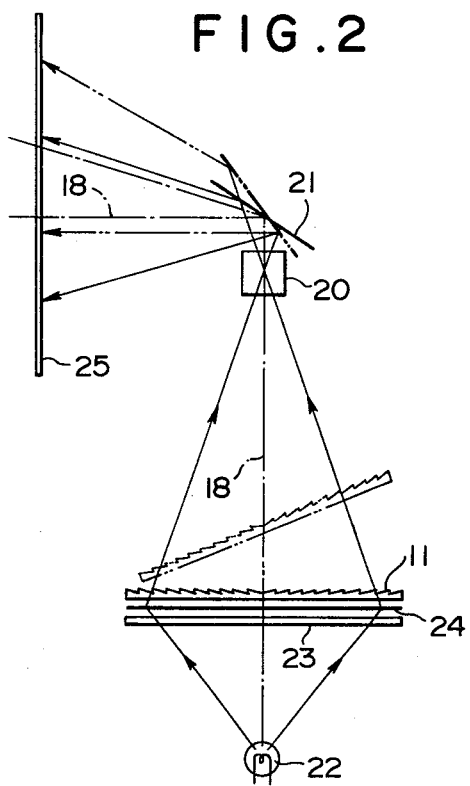
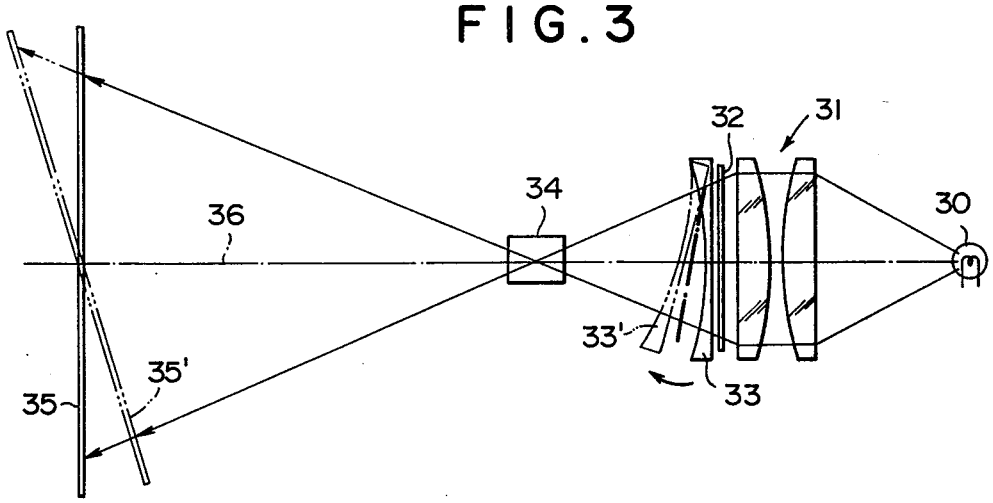

DEVICE FOR CORRECTING DISTORTION OF A PROJECTED IMAGE

BACKGROUND OF THE INVENTION

1. Field of the Invention

This invention relates to a device for correcting the distortion of an image projected on a projection screen by a projector when the optical axis of the projection lens of the projector is not perpendicular to the projection screen. The present invention relates more specifically to a device provided in a projector such as a slide projector or an overhead projector for correcting the distortion of an image obliquely projected on a projection screen supported on a wall or the like.

2. Description of the Prior Art

When an image is projected on a screen supported on a wall or the like by a projector such as a slide projector or an over-head projector, the image is distorted if the optical axis of the projection lens of the projector is not perpendicular to the plane of the projection screen. For instance, if the image is projected on a screen located at a level higher than that of the projector, as often occurs particularly in case of over-head projectors, the upper part of the image is enlarged in comparison with the lower part. Thus, the image projected on the screen is apt to be distorted owing to the difference in level between the projector and the screen.

SUMMARY OF THE INVENTION

The primary object of the present invention is, therefore, to provide a device built in a projector which corrects the distortion of the image projected on a screen regardless of how the level of the screen may differ from that of the projector.

Another object of the present invention is to provide a device for correcting the distortion of the image projected on a screen by a projector which device is simple in structure and easy to handle.

Still another object of the present invention is to provide a device for correcting the distortion of the image projected on a screen by a projector which device can be manufactured at a low cost.

The distortion correcting device in accordance with the present invention is comprised of a positive or negative correcting lens inserted between the transparency loaded in the projector for image projection and the projection lens of the projector, said correcting lens being inclinable with respect to the plane of the transparency in the projector. The direction and degree of inclination of the correcting lens with respect to the film is determined relative to the deviation from perpendicular of the optical axis of the projection lens with respect to the plane of the screen so as to correct the distortion of the image projected on the screen.

BRIEF DESCRIPTION OF THE DRAWING

FIG. 1 is a perspective view of an over-head projector provided with a distortion correcting device in accordance with an embodiment of the present invention, FIG. 2 is a vertical illustration of an optical arrangement employed in the embodiment of the present invention shown in FIG. 1, and FIG. 3 is a longitudinal side view of a slide projector provided with a distortion correcting device in accordance with another embodiment of the present invention.

DESCRIPTION OF THE PREFERRED EMBODIMENTS

Figure 4:
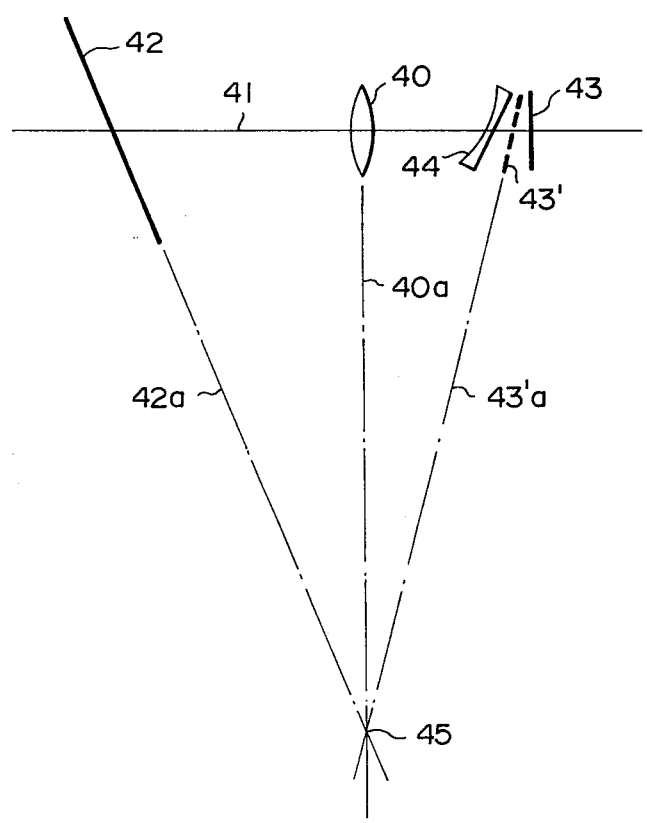
FIG. 4 shows an arrangement where Scheimflug's law is satisfied.

An embodiment of the device in accordance with the present invention employed in an over-head projector is shown in FIGS. 1 and 2. Referring to FIG. 1, an overhead projector is provided on a stage 10 thereof with a correcting lens 11. The correcting lens 11 is a negative Fresnel lens of square shape. The square correcting lens 11 has oppositely extending pins 12 and 13 on opposite sides thereof so as to be guided along a pair of guide slots 16 and 17 provided in a pair of guide members 14 and 15 vertically mounted on the opposite sides of the stage 10. One end of the correcting lens 11 has a pin 11a slidably engaged with a slot 10a provided on the top of the stage 10 so that the end of the lens 11 slides along the top face of the stage 10 as the intermediate part thereof at which the pair of pins 12 and 13 are fixed moves up and down along said slots 15 and 16. Thus, the central part of the correcting lens 11 moves up and down in the direction normal to the top of the stage 10. Above the center of the top face of the stage 10 is located a projection lens 20 which has an optical axis 18 extending through the center of the correcting lens 11 and the center of the top face of the stage 10. Immediately above the projection lens 20 is provided a rotatable mirror 21 for reflecting light coming through the projection lens 20 along the optical axis thereof toward projection screen 25 (See FIG. 2). The projection lens 20 and the mirror 21 are mounted on a support column 19 fixed to the stage 10.

The optical arrangement of the over-head projector as shown in FIG. 1 provided with the image distortion correcting device in accordance with the present invention is illustrated in FIG. 2. Within the stage 10 is provided a light source 22 to illuminate a transparency 24 placed on the top of the stage for image projection. A Fresnel type condenser lens 23 is mounted on the top of the stage 10 to be located beneath the transparency 24. The transparency 24 is placed on the top of the stage 10 so as always to be perpendicular to the optical axis 18 of the condenser lens 23 and the projection lens 20 located above the stage 10. The light passing through the transparency 24 further passes through the distortion correcting lens 11 and is projected on a screen 25 by way of the projection lens 20 and the mirror 21. The mirror 21 is rotatable to direct the light from the transparency 24 to the projection screen 25 or other surface on which the image is to be projected.

When the projection screen 25 or the like is located at the same level as that of the mirror 21 or is oriented to be perpendicular to the optical axis of the light reflected by the mirror 21, the image projected on the screen 25 is not distorted and accordingly the distortion correcting lens 11 is left in a position parallel to the transparency 24. When the screen 25 is in parallel to the optical axis 18 of the rojection lens 20 between the projection lens 20 and the stage 10 and is located at a level higher than that of the mirror 21, the optical axis of the light from the mirror 21 is not normal to the plane of the screen 25 and accordingly the image projected on the screen 25 is distorted so that the upper portion thereof is larger than the lower portion. In this case, the image correcting lens 11, which is a Fresnel negative lens, is inclined at an angle with respect to the top surface of the stage 10 to form a virtual image 26 of the transparency 24 as shown in FIG. 2, thereby reducing the magnification of the upper portion of the image projected on the screen. The angle of inclination of the image correcting lens 11 is selected so that the reduction in magnification in the upper portion of the image projected on the screen 25 offsets the enlargement of the upper portion of the image projected on the screen 25 resulting from the oblique projection of the image on the screen 25. When the image correcting lens 11 is inclined to correct the distortion of the image projected on the screen 25, the lens 11 should be inclined with its center kept to be aligned with the optical axis 18 of the projection lens 20 so that the flux of light from the transparency 24 will always pass through the projection lens 20.

Another embodiment of the present invention employed in a slide projector is illustrated in FIG. 3. Light from a light source 30 is condensed by a condenser lens system 31 and passes through a transparency 32. The light pssing through the transparency 32 is projected on a projection screen 35 by way of a negative distortion correcting lens 33 and a projection lens 34. The distortion correcting lens 33 is located immediately in front of the transparency 32 and is normally in the position indicated by a solid line and is movable between said position and an inclined position indicated by a chain line 33'. When the projection screen 35 is inclined as indicated with a chain line 35' so as not to be perpendicular to the optical axis 36 of the projection lens 34, the image projected on the screen is distorted. In this case, the negative distortion correcting lens 33 is moved to said inclined position 33' to correct the distortion of the image. The correction is accomplished on the basis of the same principle as that employed in the above described embodiment shown in FIGS. 1 and 2.

In the embodiments described hereinabove, the image distortion correcting lenses 11, 33 are all of negative type. However, it should be noted that the correcting lens may be of positive type. In this case, the direction of inclination made to correct the distortion is opposite to the direction of inclination made in the above embodiments.

In both the above embodiments, the degree of inclination of the image distortion correcting lens is so determined that the virtual image of the transparency and the projection screen may satisfy the Scheimpflug's law. This is illustrated in FIG. 4. Referring to FIG. 4, when a projection lens 40 having an optical axis 41 is used and a projection screen 42 is inclined at angle with respect to a plane normal to the optical axis 41, a sharp image of an object 43 is focused on the screen 42 if a virtual image 43' of the object 43 is formed by use of an image distortion correcting lens 44. In this case, when the Scheimpflug's law is satisfied, the plane 42a of the screen 42 and the plane 43'a of the virtual image 43' are intersected with each other on the plane 40a of the projection lens 40. The intersected line is illustrated as a point in the drawing indicated by the reference numeral 45.

I claim:

1. A device for correcting the distortion of an image projected by a projector on a projection screen comprising a positive or negative correcting lens provided between a transparency loaded in a projector and a projection lens of the projector, and means for moving said correcting lens continuously between a first position in which the lens is perpendicular to the optical axis of the projection lens and a second position in which the lens is inclined at an angle with respect to a plane perpendicular to the optical axis of the projection lens, said last-mentioned means including means for restricting the movement of the central portion of said correcting lens to a path along said optical axis when the correcting lens is moved from its first position to its second position.

2. A device for correcting image distortion as defined in claim 1 wherein said correcting lens is a Fresnel lens.

3. A device for correcting the distortion of an image projected by an over-head projector on a projection screen comprising a Fresnel correcting lens provided on a top of a stage of the over-head projector, and means for moving said correcting lens continuously between a first position in which the lens is placed on the top of the stage and a second position in which one end of the lens is raised from the top of the stage with the opposite end of which is on the top of the stage, said last-mentioned means including means for restricting the movement of the central portion of said correcting lens to a path along a normal to said top of said stage when the correcting lens is moved from its first position to its second position.

4. A device for correcting the distortion of an image projected by a slide projector on a projection screen comprising a correcting lens provided immediately in front of a transparency loaded in the projector, and means for moving said correcting lens continuously between a first position in which the lens is in parallel to the transparency and a second position in which the lens is inclined at an angle with respect to the plane parallel to the transparency, said last-mentioned means including means for restricting the movement of the central portion of said correcting lens to a path along a normal to said transparency when the correcting lens is moved from its first position to its second position.

* * * * *